Aug. 1, 1939.   F. P. FULMER ET AL   2,167,832
ELECTRIC WATT-HOUR METER
Filed May 3, 1937   3 Sheets—Sheet 2

Patented Aug. 1, 1939

2,167,832

UNITED STATES PATENT OFFICE

2,167,832

ELECTRIC WATT-HOUR METER

Frederick P. Fulmer, Trussville, and Joseph S. Hollingsworth, Tarrant, Ala., assignors of thirty per cent to said Fulmer, forty per cent to Charles Denegre, Birmingham, Ala., and thirty per cent to R. C. Todd, Trussville, Ala.

Application May 3, 1937, Serial No. 140,304

3 Claims. (Cl. 171—34)

This invention relates to electric watt-hour meters and has for its object means for preventing what is commonly known as "jumping meters." It is well known that many devices and schemes are being resorted to by users of electric current for the purpose of preventing electricity used from being registered on the meter. The present invention is a very simple, inexpensive and practical device or fixture that will overcome and prevent the unauthorized use of electric current.

The right is reserved to manufacture the various parts out of any material that may be best suitable for the purpose but it has been found that metals usually used in the manufacture of electric meters and their attachments are the best suited for the purposes of this invention. The right is also reserved to make any modifications or changes of the various parts so long as the same remain within the spirit and scope of the invention.

Figure 1:
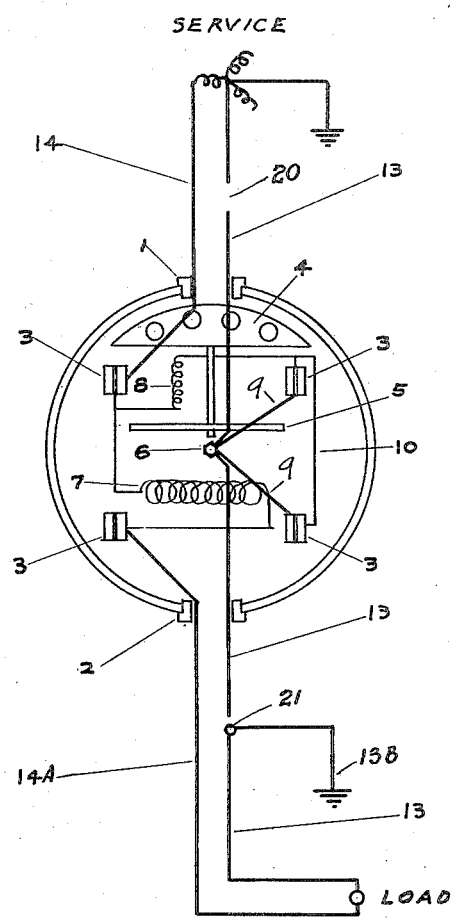
Figure 2:
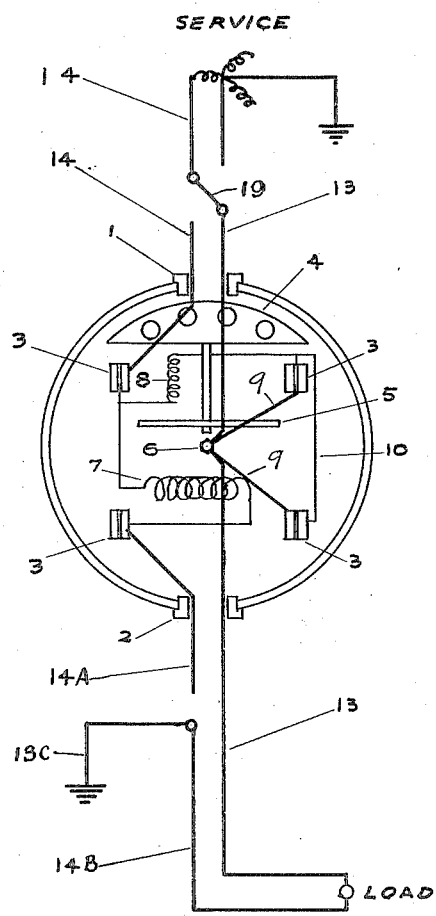
Figure 3:
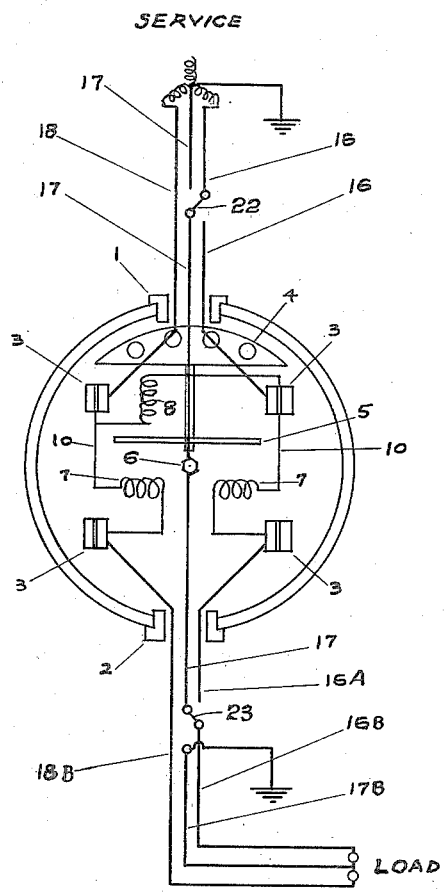
Figure 4:
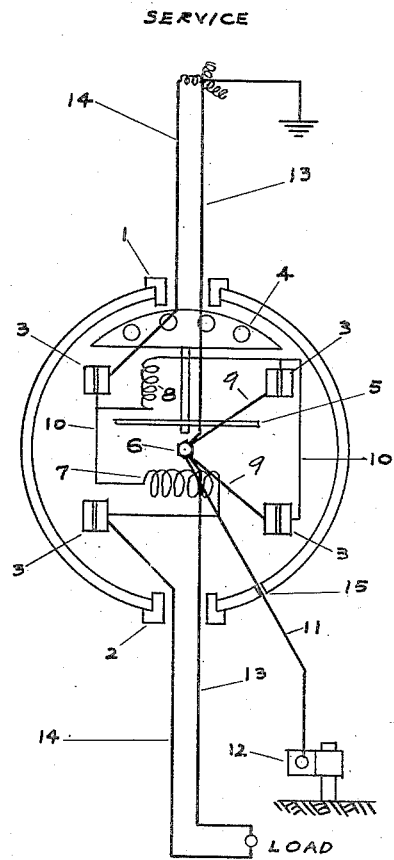
Figure 5:
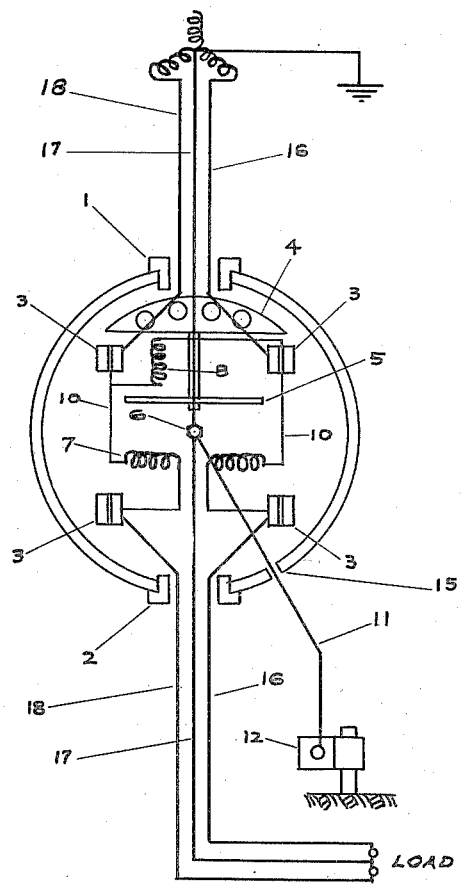

The mechanical features of the invention are illustrated in the substituted drawings in which Fig. 1 is a plan view of a socket type electric meter less part of the registering mechanism, having two wires from the service with one wire cut before it enters the meter and the same wire cut after it passes out of the meter but ahead of the load, and a ground wire leading from the load. Fig. 2 is a plan view of a socket type electric meter less part of the registering mechanism, with two wires from the service with both wires cut before they enter the meter and a connection formed between the service end of one wire and the dead end of the other to complete a live wire through the meter to the load; and a part of the continuation of the dead wire passing out of the meter; and a ground wire leading from the load. Fig. 3 is a plan view of a socket type electric meter less part of the registering mechanism, with three wires from the service with the ground wire and one live wire cut before entering the meter and a connection formed between the live end of the live wire and the meter end of the ground wire; and the ground wire connected to the load end of the cut live wire; and a ground wire leading from the load. Fig. 4 is a plan view of a socket type electric meter less part of the registering mechanism, with standard two wire service connections entering and passing out of meter to load, with a ground wire (the subject of this invention) connected to one service wire, lead wires to two terminals of the meter mechanism and potential coil, and a stud in the back of the meter case; the other end of the ground wire (the subject of this invention) being connected to a ground post or pipe. Fig. 5 is the same as Fig. 3 with the wires not cut, and a ground wire (subject of this invention) attached.

Similar reference numerals refer to similar parts throughout the several views.

Referring to the drawings 1 indicates the bushing surrounding the hole in the top of the meter case through which a conduit (not shown) would pass containing service wires or cable. The two wire system is shown in Figs. 1, 2 and 4. In Fig. 1 the current passes in on wire 14 which is connected to switch jaw receptacle 3 that receives and holds with the other three receptacles part of the meter registering mechanism (not shown) in place. The current passes through current coil 7 and potential coil 8 and along the connections to the meter mechanism and would energize the mechanism were it not for the cuts or gaps in wire 13 at 20 and 21. Then to the dead load end of wire 13 ground 13B is established and the lights burn because the circuit is completed through the earth ground. The cuts or gaps 20 and 21 are exaggerated in order to bring out this disclosure. The fraudulent user does not leave the gaps showing but conceals the same with tape. This is one of the schemes used for what is commonly known as "meter jumping."

The outlet of the meter case is provided with a bushing 2 similar to bushing 3. The meter is provided with a dial at 4, a rotating disc 5, and other not shown parts of the registering mechanism.

In Fig. 2 the current enters on wires 13 and 14 as both are cut ahead of the meter and a connection 19 is formed between the live end of 14 and the dead end of 13 and is carried to stud 6 to which are connected lead wires 9 in contact with receptacle jaws 3 that hold and contact part of the meter registering mechanism. The current is carried on wire 10 to coils 8 and 7 but fails to energize the registering mechanism because of the cuts or gaps that prevent the circuit being completed over wires 14 and 14A. By establishing the ground 13C on the dead end of load wire 14B, the lights will burn, the circuit being completed through the earth ground, but the meter will not register.

Fig. 4 shows a regular standard two wire system with the additional ground wire 11 (the subject of the present invention) connected to stud 6 which is in contact with wires 9, two of receptacles 3, wire 10, coils 7 and 8. This ground wire passes out through hole 15 to ground post or pipe 12. With this ground attached the meter will continue to register in either of the schemes shown in Figs. 1 and 2 because the circuit is maintained by passing through the earth ground.

Fig. 3 shows a three wire system with ground wire 17 and live wire 16 cut ahead of the meter, and connection 22 formed between the live end of wire 16 and the end of ground wire 17 that enters the meter. Between the meter and the load, ground wire 17 is again cut and connection 23 formed between that part coming out of the meter and 16B. Then a ground is established on 17B. This scheme carries current through the meter on two wires and connections comprising in one instance 16, 22, 17, 23, 16B, and in the other comprising 18, 10, coil 7, 18B. The current reaches the load but the meter will not register because the mechanism is not energized, one side being dead.

Fig. 5 shows the regular standard three wire system with the additional ground wire 11 attached to stud 6 in contact with the regular ground wire 17. The outside end of ground wire 11 is connected to ground pipe or post 12. With this ground wire 11 in place the scheme shown in Fig. 3 cannot be used because when the wires are cut and transposed ahead of the meter a short circuit occurs and either blows out the fuse at the transformer or burns the wire where the transposed connection is made. This hazardous condition is the result of grounding of the live wire by the transposition.

A party desiring to jump an electric meter does not use the crude method of stringing wires from the main source lines to the load lines as this is too easy to detect, but generally resorts to a concealed scheme that cannot be detected by the meter reader or inspector without a detailed examination which of course requires a lot of time.

The socket type outside meter is being generally adopted by electric utility companies because it is the best and most satisfactory meter on the market. While this improved grounding system may be applied to any watt-hour meter the socket type is shown in the drawings with the improvement attached.

Some of the best "jumping" methods have been mentioned but there are others along the same line. The use of conduits and cables from the source to the meter and from meter to load has not been effective in preventing meter "jumping" because the "expert jumpers" cut into the conduit or cable where it is placed against the building wall and establish connections to be able to cut the meter in part of the time and out part of the time.

The present grounding system covers a bare heavy wire leading from the ground post into the sealed meter case with proper internal connections as described. As long as this simple device remains intact the meter will either register or cause a blow-out. When the meter reader or inspector comes along all he has to do is to pull or jerk the bare ground wire to see if it is fastened firmly at both ends. This test takes only a few seconds.

The ground also serves as a safety device in case of accidental high voltage or the striking of lightning. The heavy ground wire in most such instances will carry to the ground before any serious damage results to the meter mechanism or other equipment.

Having described our invention we claim:

1. A fraud prevention assembly for watt-hour meters, for use with a three wire grounded neutral system, comprising; a socket type sealed meter casing, voltage and current windings mounted therein, a grounding stud mounted in the rear wall of said casing, said casing having an aperture therein through which a snugly fitting bare ground wire is passed for connection to said grounding stud, the ground wire being connected to said stud and in contact with said bare ground wire, the two live wires of said system being connected to the current and voltage coils and connections for flow of current through the meter registering mechanism, said bare ground wire having its other end in contact with the earth.

2. A fraud prevention assembly for watt-hour meters, for use with a two wire system, comprising; a socket type sealed meter casing, voltage and current windings mounted therein, a grounding stud mounted in the rear wall of said casing, said casing having an aperture therein through which a snugly fitting bare wire is passed for connection to said grounding stud, connections from said grounding stud to wires leading to the voltage and current coils and meter registering mechanism, the other end of said bare ground wire being in contact with the earth.

3. A fraud prevention assembly for watt-hour meters, for use with a multiple wire grounded neutral system, comprising a sealed type meter casing, voltage and current windings mounted therein, a grounding stud mounted in the rear wall of said casing, said casing having an aperture therein through which a snugly fitting bare ground wire is passed for connection to said grounding stud, the main ground wire of the system being connected to said grounding stud and bare wire, the other end of said bare wire being in contact with the earth.

FREDERICK P. FULMER.
JOSEPH S. HOLLINGSWORTH.

DISCLAIMER 2,167,832.—*Frederick P. Fulmer*, Trussville, and *Joseph S. Hollingsworth*, Tarrant, Ala. ELECTRIC WATT-HOUR METER. Patent dated August 1, 1939. Disclaimer filed December 4, 1941, by the assignees, *Charles Denegre, Frederick P. Fulmer*, and *R. C. Todd*.

Hereby enter this disclaimer to claims 1, 2, and 3 of the patent.

[*Official Gazette December 23, 1941*.]